UNITED STATES PATENT OFFICE.

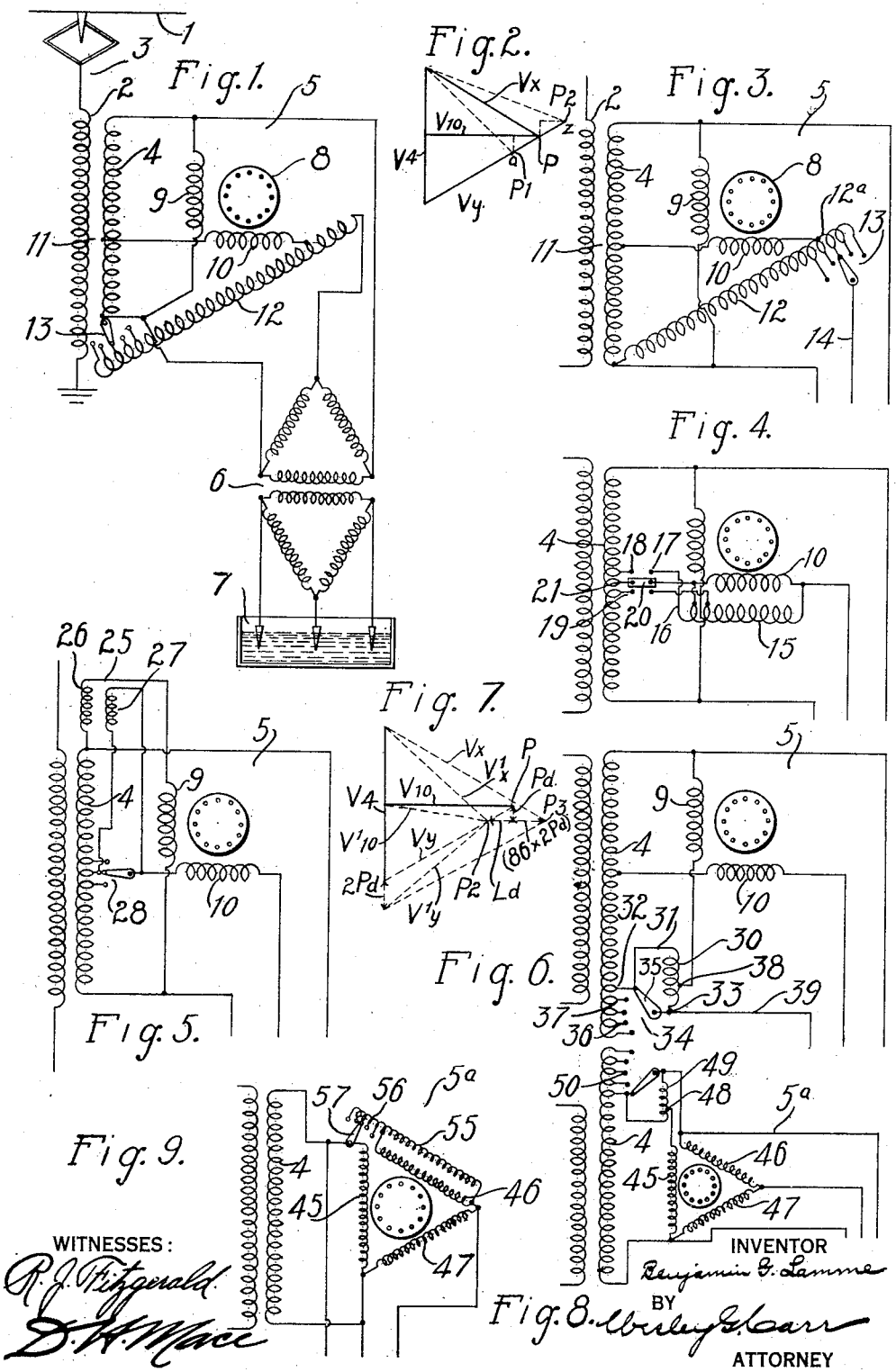

BENJAMIN G. LAMME, OF PITTSBURGH, PENNSYLVANIA, ASSIGNOR TO WESTINGHOUSE ELECTRIC AND MANUFACTURING COMPANY, A CORPORATION OF PENNSYLVANIA.

SYSTEM OF DISTRIBUTION AND CONTROL.

1,243,307. Specification of Letters Patent. Patented Oct. 16, 1917.

Application filed March 23, 1914. Serial No. 826,631.

*To all whom it may concern:*

Be it known that I, BENJAMIN G. LAMME, a citizen of the United States, and a resident of Pittsburgh, in the county of Allegheny and State of Pennsylvania, have invented a new and useful Improvement in Systems of Distribution and Control, of which the following is a specification.

My invention relates to systems of distribution and control, with particular reference to phase converters to be employed in converting energy from a single-phase system into polyphase energy for operating dynamo-electric machines.

One of the objects of my invention is to simplify and improve the connections and operation of phase converters, and to provide ready and effective means for regulating the operation of this class of apparatus, under load conditions.

It is my special aim to provide means for effecting concurrent and proportional changes in the amount and the phase position of the converter voltages by means of a single switching device or set of switches.

When phase converters of the above-indicated class are subjected to load, there results an inherent reduction in voltage due to the ohmic and reactive drop in the converter windings, and also a displacement of phase position, causing an unbalanced relation between the several phases. In my copending application, Serial No. 808,714, filed December 26, 1913, I have disclosed separate and independent means for compensating for voltage drop and phase distortion, and such means embodies a plurality of switching devices or sets of switches, which are undesirable and render the system unduly complicated and difficult to manipulate.

According to my present invention, I propose to employ a single switching device or set of switches to accomplish the combined functions referred to and to effect concurrent and proportional changes of the converter electrical characteristics, under load conditions.

My invention may best be understood by reference to the accompanying drawing, in which Figure 1 is a diagrammatic view of a system embodying my invention, Fig. 2 is a vector diagram showing the relationship of certain of the voltages of the system, Figs. 3, 4, 5 and 6 are diagrammatic views of modified forms of my invention, Fig. 7 is a vector diagram of certain of the voltages of the apparatus shown in Fig. 6, and Figs. 8 and 9 are diagrammatic views of further modifications of my invention.

Referring to Fig. 1, a supply circuit conductor 1, such as a trolley conductor, delivers single-phase energy to a primary winding 2 of a transformer 3 having a secondary winding 4 which is adapted to supply energy to a phase converter 5, and a dynamo-electric machine 6 which is governed by a liquid rheostat 7.

The phase converter 5 is preferably of the induction-motor, squirrel-cage type and embodies a rotor 8, a primary or exciting winding 9 and a secondary winding 10. The windings 9 and 10 are independent, and are inductively related and disposed in quadrature relation. The exciting winding 9 is connected across the secondary transformer winding 4 and is excited in phase therewith, while the secondary converter winding 10 is connected to substantially the midpoint 11 of the transformer winding 4 and is so designed that the voltage delivered thereby is approximately 86.6% of the voltage of the transformer winding 4. By reason of this well known "T-connection" and the specified relationship of voltages, balanced three-phase voltages are obtained.

Referring now to Fig. 2, $V_4$ and $V_{10}$ respectively represent the voltages of the transformer winding 4 and the converter winding 10, which, when combined in the manner described, produce a balanced relation of voltages, in which $V_X$ and $V_Y$ are equal to $V_4$, the point P being located at the end of the line $V_{10}$.

If load is placed on the converter, there is a distortion of phase and a reduction of voltage, which causes the point P to be displaced and to occupy a position $P^1$ which, of course, does not necessarily fall on the line $V_y$ as shown. If, on the other hand, the dynamo-electric machine 6 serves as a generator to return energy to the source, the point P moves to a position $P^2$, inasmuch as the phase distortion is in the opposite direction, while the voltage is increased rather than decreased. The point P, therefore, travels along the line $a$ to $z$ which is substantially a straight line, over a considerable range in the variation of load. It is clear, therefore, that the phase distortion and change of voltage may be made proportional, and, in such case, provision may be made to compensate for these conditions concurrently by a single switching means.

I propose, therefore, to employ an auxiliary auto-transformer 12 which is connected between the outer end of the converter winding 10 and some suitable point in the main transformer 4, and to provide a switching device 13 for shifting the connection of the secondary transformer winding 4 to the auxiliary auto-transformer 12. Thus, when the converter is loaded, the switching device 13 is operated toward the left to increase the number of active turns of the auto-transformer 12, to effect a concurrent compensation for voltage reduction and phase distortion. This arrangement of apparatus is particularly desirable, inasmuch as the switching device 13 is required to handle only the magnetizing current of the auto-transformer 12 and hence may be of relatively small capacity.

Obviously, compensations for phase distortion and voltage increases, during periods when the motor 6 is operating as a generator, may be effected by adjusting the connections of the auto-transformer 12 in the opposite direction.

Referring to Fig. 3, a somewhat similar system is shown, in which the auto-transformer 12 has a plurality of end turns 12$^a$ of relatively large capacity which are provided with a switching device 13 for changing the connections of the motor conductor 14, under load conditions. In this case, when the converter is loaded, the switching device 13 is moved to the right to include additional active turns 12$^a$ and thereby tend to correct for the voltage drop and phase distortion. However, it is clear that the switching device 13 is required to handle the load current of the converter winding 10 and hence it, as well as the end turns 12$^a$, must be of liberal capacity. Adjustments in the opposite direction may be made during regenerative periods.

Reference may now be had to Fig. 4, in which the converter winding 10 is connected in multiple to an auto-transformer winding 15 which is provided with a plurality of end taps 16 that are connected to a set of contact terminals 17. Corresponding terminals 18 are connected to taps 19 located in substantially the middle portion of the transformer secondary winding 4, and a movable switch member 20 is provided for bridging the cooperating sets of terminals 17 and 18, in pairs.

If the switch member 20 is caused to engage the upper set of terminals, under load conditions, the active turns of the auto-transformer 15 are increased, thus boosting the voltage of the converter winding 10, while the phase displacement is compensated for by moving the connection of the converter winding 10 to the transformer winding 4 above the neutral or mid-point 21. A similar adjustment in the opposite direction is effected, during regeneration, for accomplishing the desired end.

In Fig. 5, an auxiliary transformer 25 is provided, having its secondary winding 26 connected in circuit between the upper terminal of the main transformer winding 4 and the exciting winding 9 of the converter 5, and its primary winding 27 is connected between one terminal of the secondary converter winding 10 and the mid-point 21 of the transformer winding 4. Under conditions of no load, a switching device 28 is adapted to short-circuit the auxiliary transformer primary winding 27, and may be moved in either direction to connect the converter winding 10 to points in the secondary transformer winding 4, either above or below its neutral or mid-point 21.

As shown in the figure, the auxiliary transformer 25 is inactive under no-load conditions, because of the short-circuit connection across its primary winding 27. When the converter 5 is loaded, the device 28 is caused to make contact with a suitable tap above the mid-point, thereby correcting for the phase displacement, and, at the same time, removing the short-circuit connection of the transformer primary winding 27 and connecting said winding in multiple circuit with a portion of the turns of the transformer secondary winding 4. Thus, the transformer primary winding 27 induces a voltage in the secondary winding 28 of the transformer 25 and impresses an additional voltage across the exciting winding 9 of the converter and builds up the converter voltage to the desired amount.

Compensation for the inherent changes, when the driving motor (not shown) acts as a generator, are effected by adjustments in the opposite direction.

Referring now to Fig. 6, an auxiliary auto-transformer winding 30 has one of its terminals 31 connected to a suitable point 32 in the transformer secondary winding 4, and its other terminal 33 is connected to a switching device 34 comprising a movable contact member 35 and a plurality of contact terminals 36 which are severally connected to different points in the end turns 37 of the transformer winding 4. One end of the exciting winding 9 of the converter 5 is connected to an intermediate point 38 in the auxiliary auto-transformer winding 30, and the location of this intermediate connection is of prime importance, as hereinafter set forth. One of the motor conductors 39 is connected to the end 33 of the auxiliary auto-transformer 30 and to the movable contact member 35 of the switching device 34.

Under no-load conditions, the apparatus and connection are as shown in the figure and, therefore, the auto-transformer winding 30 is short-circuited and ineffective. Under these conditions, the voltage of the transformer secondary winding 4 is represented in Fig. 7 by $V_4$, while $V_{10}$ represents the voltage of the converter winding 10. Balanced voltage conditions then obtain, $V_4$, $V_x$ and $V_y$ being equal.

If the converter is loaded, the point P is moved to some other point $P^2$ by reason of the phase distortion and decrease in voltage. For convenience, point $P^2$ is illustrated as falling upon the line $V_y$, but it may occupy a position outside of said line. The amount of phase distortion is represented by $P_D$ and the voltage drop due to load by $L_D$, and, in order to reëstablish balanced voltage conditions, it is necessary to first compensate for the phase distortion by adding a voltage to that of the transformer secondary winding 4 that is equal to twice the distortion voltage $P_D$. By so doing, the position of line $V_{10}$ is changed to $V^1_{10}$ and the voltages $V^1_x$ and $V^1_y$ are equalized, being less, however, than the voltage $V_4$ plus the added increment $2P_D$. It is then necessary to build up the converter voltage $V^1_{10}$ by adding a voltage equal to the drop due to load $L_D$ and 86.6% of increment $2P_D$. The point $P^2$ is thus moved to $P^3$, and balanced voltage conditions are reëstablished, although the value of the voltages has been increased.

It is seen that, with the system shown in Fig. 6, a new condition is encountered, namely, the variation in the amount of voltage supplied to the driving motor (not shown) with the load. Theoretically, this is a desirable condition of operation for polyphase induction motors because of the relatively low voltage supplied thereto at light loads and the correspondingly high voltage delivered at heavy loads, which causes a better performance of the motor, inasmuch as it is operated at a good power factor throughout the range of load.

Referring again to Fig. 6, as the contact member 35 is moved downwardly into contact with the terminals 36, a voltage is added to that of the transformer secondary winding 4 and supplied to the driving motor. By reason of the connection of the converter winding 9 to the intermediate point 38 in the transformer winding 30, a certain portion of the added transformer voltage is impressed upon the exciting winding 9 and, hence, tends to build up the voltage of the secondary converter winding 10. The point of connection 38 is so chosen that the increased excitation of the converter winding 9 is just sufficient to maintain a balanced voltage relation and to compensate for phase distortion, voltage drop and increase of motor voltage upon one of the phase windings of the motor. Thus, by adjustment of a single switching device, proportional compensations for phase distortion and voltage drop are effected, while the motor voltages are increased with the load and also maintained in balanced relation.

Reference may now be had to Fig. 8, in which a phase converter $5^a$ of the three-phase type is employed, having its windings 45, 46 and 47 connected in "open-delta" relation. The winding 45 constitutes the exciting winding of the converter and its upper end is connected to an intermediate point 48 in an auxiliary auto-transformer 49, in the manner, and for the same purpose as, described with respect to Figs. 6 and 7. Similarly a switching device 50 is employed for changing the connections of the transformer 49 with respect to the main transformer winding 4 to accomplish a concurrent compensation for phase distortion and voltage drop while increasing the voltage supplied to the driving motor (not shown). No other description of this modified system and its operation is deemed necessary, on account of its similarity to the system set forth in Fig. 6.

Referring now to Fig. 9, a three-phase converter $5^a$ is employed having its windings 45, 46 and 47 connected in "open-delta," one of its windings 46 being connected in multiple to an auxiliary auto-transformer 55, which is provided with a plurality of end turns 56 having different connections to an adjustable switching device 57 by means of which the desired results may be secured in the same general manner hereinbefore set forth. With this system, however, there is no increase of motor voltage accompanying the adjustment, as is the case with the systems shown in Fig. 6 and Fig. 8.

These and other modifications in the circuit connections and arrangement and location of parts, and in the mode of operation, are contemplated and are intended to be covered by the appended claims.

I claim as my invention:

1. The combination with a single-phase source of energy, and a dynamo-electric machine connected thereto to aid in converting single-phase energy into polyphase energy, of means embodying a single switching device for adjusting the relative amounts and phase positions of the delivered polyphase voltages.

2. The combination with a single-phase source of energy, and a dynamo-electric machine connected thereto to aid in converting single-phase energy into polyphase energy, of means for proportionally varying the relative amounts and phase positions of the delivered polyphase voltages.

3. The combination with a single-phase source of energy, and a polyphase dynamo-electric machine connected thereto to aid in converting single-phase energy into polyphase energy, of a single means for maintaining balanced resultant voltage relations between the several phases of the dynamo-electric machine, under load conditions.

4. The combination with a source of single-phase energy, a phase converter for aiding in converting single-phase energy into polyphase energy, and electrical means adapted to receive polyphase energy from said source and said converter, of means for increasing certain of the polyphase voltages supplied to said electrical means and maintaining a balanced relation of said voltages.

5. The combination with a source of single-phase energy, a phase converter for aiding in converting single-phase energy into polyphase energy, and electrical means adapted to receive polyphase energy from said source and said converter, of means embodying a single switching device for increasing certain of the voltages supplied to said electrical means and concurrently correcting the inherent phase displacement thereof under load conditions.

6. The combination with a source of single-phase energy, a phase converter for aiding in converting single-phase energy into polyphase energy, and electrical means adapted to receive energy from said source and said converter, of an auxiliary transformer winding energized from said source and one of the converter windings, and a switching device for variably connecting said winding to the source of energy in such manner as to effect proportional increases and corrections for phase distortion of the polyphase voltages delivered to the electrical means under load conditions.

7. The combination with a source of single-phase energy, a phase converter having a plurality of windings respectively connected across said source and to the substantial mid-point thereof, and polyphase electrical means connected to receive three-phase energy from said source and said converter, of means for effecting proportional changes in the amount and phase position of the voltages supplied to said electrical means under load conditions.

8. The combination with a source of single-phase energy, a phase converter having a plurality of windings respectively connected across said source and to the substantial mid-point thereof, and polyphase electrical means connected to receive three-phase energy from said source and said converter, of means embodying an auxiliary transformer and a single switching device for adjusting the amount and phase position of the voltages supplied to said electrical means.

9. The combination with a source of single-phase energy, a phase converter having a plurality of windings respectively connected across said source and to the substantial mid-point thereof, and polyphase electrical means connected to receive three-phase energy from said source and said converter, of a transformer connected between one terminal of the source and one terminal of one of said converter windings, and a switching device for changing the connections of one end of said transformer.

10. The combination with a source of single-phase energy, a phase converter having a plurality of windings respectively connected across said source and to the substantial mid-point thereof, and polyphase electrical means connected to receive three-phase energy from said source and said converter, of a transformer connected between one terminal of the source and one terminal of one of said converter windings, and means for changing the active turns of said transformer for effecting proportional adjustments of the amount and phase position of the voltage supplied to said electrical means.

11. The combination with a source of single-phase energy, a phase converter having a plurality of windings respectively connected across said source and to the substantial mid-point thereof, and polyphase electrical means connected to receive three-phase energy from said source and said converter, of a transformer connected between one terminal of the source and one terminal of one of said converter windings, and a switching device for shifting one of the connections of said transformer along said transformer.

12. The combination with a source of single-phase energy, a phase converter having a plurality of windings respectively connected across said source and to the substantial mid-point thereof, and polyphase electrical means connected to receive three-phase energy from said source and said converter, of a transformer connected between one terminal of the source and one terminal of one of said converter windings, and means for varying the magnetization of said transformer.

13. The combination with a source of single-phase energy, a phase converter for aiding in converting single-phase energy into polyphase energy, and polyphase electrical means adapted to receive energy from said source and said converter, of means for increasing the amount and concurrently compensating for phase distortion of the voltage supplied to said polyphase electrical means under load conditions.

14. The combination with a single-phase source of energy, electrical means connected thereto and acting in conjunction therewith for converting single-phase energy into polyphase energy, and translating means receiving polyphase energy from said source and said electrical means, of means for proportionately and concurrently varying the relative amounts and phase positions of the polyphase energy delivered to said translating means.

15. The combination with a single-phase source of energy, and a self-propelled polyphase electrical machine connected thereto and acting in conjunction therewith for converting single-phase into polyphase energy, of means embodying a single switching device for concurrently adjusting the relative amounts and phase positions of the delivered polyphase voltages.

In testimony whereof, I have hereunto subscribed my name this 19th day of Mar., 1914.

BENJ. G. LAMME.

Witnesses:
F. T. HAGUE,
B. B. HINES.

Copies of this patent may be obtained for five cents each, by addressing the "Commissioner of Patents, Washington, D. C."